United States Patent
Lee et al.

(10) Patent No.: US 8,621,414 B2
(45) Date of Patent: Dec. 31, 2013

(54) METHOD AND ALGORITHM ANALYZER FOR DETERMINING A DESIGN FRAMEWORK

(75) Inventors: Gwo-Giun Lee, Taipei (TW); Ming-Jiun Wang, Jhuci Township (TW); He-Yuan Lin, Hunei Township (TW)

(73) Assignee: National Cheng Kung University, Tainan (TW)

( * ) Notice: Subject to any disclaimer, the term of this patent is extended or adjusted under 35 U.S.C. 154(b) by 882 days.

(21) Appl. No.: 12/764,781

(22) Filed: Apr. 21, 2010

(65) Prior Publication Data
US 2011/0265057 A1    Oct. 27, 2011

(51) Int. Cl.
*G06F 17/50* (2006.01)
(52) U.S. Cl.
USPC .......................... 716/132; 716/101; 716/104
(58) Field of Classification Search
USPC ........................................ 716/101, 104, 132
See application file for complete search history.

(56) References Cited

U.S. PATENT DOCUMENTS 8,180,964 B1 * 5/2012 Koh et al. ..................... 711/118

* cited by examiner

*Primary Examiner* — Thuan Do
(74) *Attorney, Agent, or Firm* — Kilpatrick Townsend and Stockton LLP

(57) ABSTRACT

A method of determining a design framework is implemented by an algorithm analyzer. The method includes configuring the algorithm analyzer to perform intrinsic complexity analysis of an algorithm for a predetermined application to obtain a set of parameters representing intrinsic characteristics of the algorithm. The method also includes configuring the algorithm analyzer to establish candidate design frameworks based on the parameters. Each candidate design framework includes a set of design constraints corresponding to the algorithm and which are used when designing a hardware and/or software configuration for implementing the predetermined application. The method also includes configuring the algorithm analyzer to analyze the suitability of the set of design constraints of each candidate design framework based on given specification restrictions of the predetermined application to determine which candidate design framework(s) is suited for the predetermined application.

14 Claims, 2 Drawing Sheets

METHOD AND ALGORITHM ANALYZER FOR DETERMINING A DESIGN FRAMEWORK

BACKGROUND OF THE INVENTION

1. Field of the Invention

The present invention relates to a method of determining a design framework, more particularly to a method of determining a design framework based on the intrinsic complexities of a plurality of algorithms for a predetermined application.

2. Description of the Related Art

Conventionally, the simplest way of estimating the complexity of an algorithm is that in which the nested loop architecture within the algorithm is used as the basis for estimating the complexity of the same. The following pseudocode of an algorithm is used as an example:

```
for (i=1 to n) {            // first loop
    for (j=1 to n) {        // second loop
        action A
    }
}
```

Since the second loop is included within the first loop, the complexity of the algorithm is estimated to be $O(n^2)$.

However, for algorithms used in many applications, such as multimedia applications, it is not feasible to use such a rudimentary approach to analyze complexity. As a result, many improved measuring methods of estimating complexity of algorithms have been disclosed, such as "H.264/AVC Baseline Profile Decoder Complexity Analysis" by M. Horowitz et al. and published in 2003 in IEEE Transactions on Circuits and Systems for Video Technology. In this article, the TRIMEDIA® TM-1300 DSP (digital signal processor) and 600 MHz PENTIUM® 3 CPU (central processing unit) hardware architectures are used to conduct complexity analysis with respect to the H.264/AVC algorithm. Hence, the method proposed in this article utilizes a bottom-up approach in performing analysis, in which the hardware architecture to be used is first established, after which complexity analysis is performed with respect to a specific algorithm with the aim of finding the optimal algorithm for the particular hardware architecture. In this particular instance, therefore, the analysis result is only suitable for use in conjunction with the TRIMEDIA® TM-1300 DSP and 600 MHz PENTIUM® 3 CPU hardware architectures.

Another example of an improved method of estimating the complexity of algorithms is the method disclosed in "High-Abstraction Level Complexity Analysis and Memory Architecture Simulations of Multimedia Algorithms" by M. Ravasi and M. Mattavelli and published in 2005 in IEEE Transactions on Circuits and Systems for Video Technology. In this method, a C language code of an algorithm and an externally defined memory simulation core are used together to analyze the complexity of an algorithm. However, a bottom-up approach is also used in this method, such that the analysis result obtained therefrom varies with different memory simulation cores. Moreover, different results are caused by different C language coding styles or when the program code is converted into another programming language.

The methods disclosed in the aforementioned articles share the common disadvantage of using a bottom-up approach to perform analysis when estimating complexity of an algorithm. With such an approach, since a specific software and hardware platform is determined before analysis, an optimal algorithm is found for the specific software and hardware platform, and the algorithm may not be the most suitable for different situations. In other words, the prior art methods only find a local optimal solution for a specific software and hardware platform, and this often is not the global optimal solution.

SUMMARY OF THE INVENTION

Therefore, the object of the present invention is to provide a method of determining a design framework.

Another object of the present invention is to provide an algorithm analyzer capable of implementing the method of this invention.

According to one aspect, the method of this invention is implemented by an algorithm analyzer and comprises: a) configuring the algorithm analyzer to perform intrinsic complexity analysis with respect to an algorithm for a predetermined application to obtain a set of parameters representing intrinsic characteristics of the algorithm; b) configuring the algorithm analyzer to establish a plurality of candidate design frameworks based on the set of parameters obtained in step a), each of the candidate design frameworks including a set of design constraints corresponding to the algorithm, the set of design constraints being used when designing a hardware and/or software configuration for implementing the predetermined application; and c) configuring the algorithm analyzer to analyze the suitability of the set of design constraints of each of the candidate design frameworks established in step b) based on given specification restrictions of the predetermined application so as to determine which ones of the candidate design frameworks are suited for implementing the predetermined application.

According to another aspect, the algorithm analyzer of this invention comprises: an intrinsic analysis module for performing intrinsic complexity analysis with respect to the algorithm to obtain a set of parameters representing intrinsic characteristics of the algorithm; a design framework establishing module coupled to the intrinsic analysis module, the design framework establishing module establishing a plurality of candidate design frameworks based on the set of parameters obtained by the intrinsic analysis module, each of the candidate design frameworks including a set of design constraints corresponding to the algorithm, the set of design constraints being used when designing a hardware and/or software configuration for implementing the predetermined application; and a suitability analyzing module coupled to the design framework establishing module, the suitability analyzing module analyzing the suitability of the set of design constraints of each of the candidate design frameworks established by the design framework establishing module based on given specification restrictions of the predetermined application so as to determine which ones of the candidate design frameworks are suited for implementing the predetermined application.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The preferred embodiment of a method of determining a design framework according to the present invention is directed to a predetermined application, e.g., the specific multimedia application of deinterlacing. In the preferred embodiment, although a plurality of algorithms related to the multimedia application are analyzed so as to find the optimal design framework(s) and the corresponding algorithm(s) for implementing this multimedia application, the present invention is not limited in this regard, and the method may be used to determine a design framework based on a single algorithm. Furthermore, in the preferred embodiment, intrinsic complexities of the plurality of algorithms related to the multimedia application are analyzed so as to find the optimal design framework(s).

Figure 2:
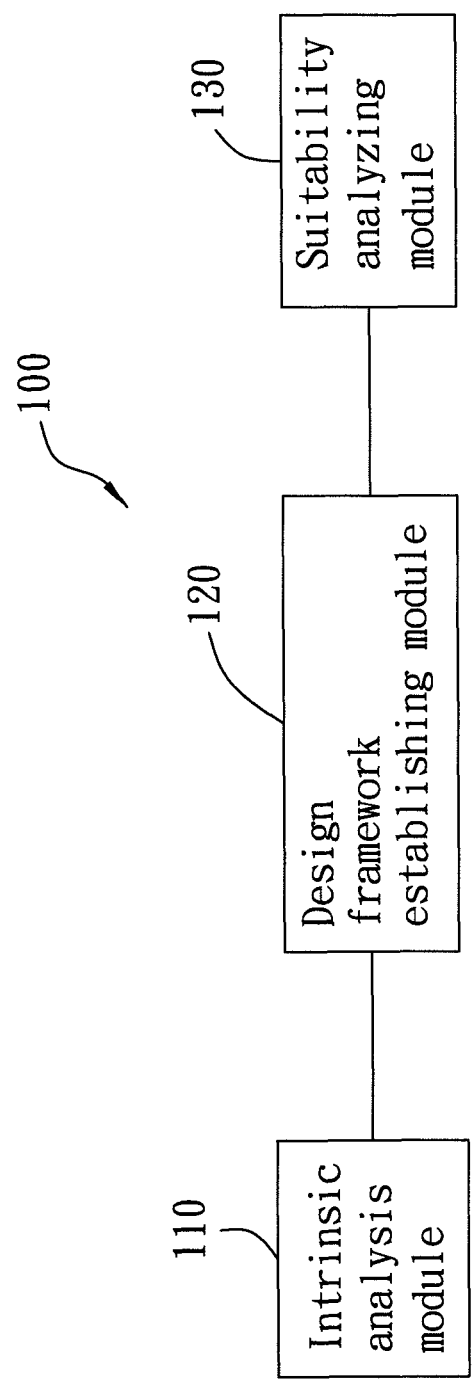
FIG. 2 is a schematic circuit block diagram of an algorithm analyzer for determining a candidate design framework according to a preferred embodiment of the present invention.

The method of the present invention is implemented by a system (referred to as an algorithm analyzer hereinafter) 100, as shown in FIG. 2. The algorithm analyzer 100 includes an intrinsic analysis module 110, a design framework establishing module 120, and a suitability analyzing module 130.

Figure 1:
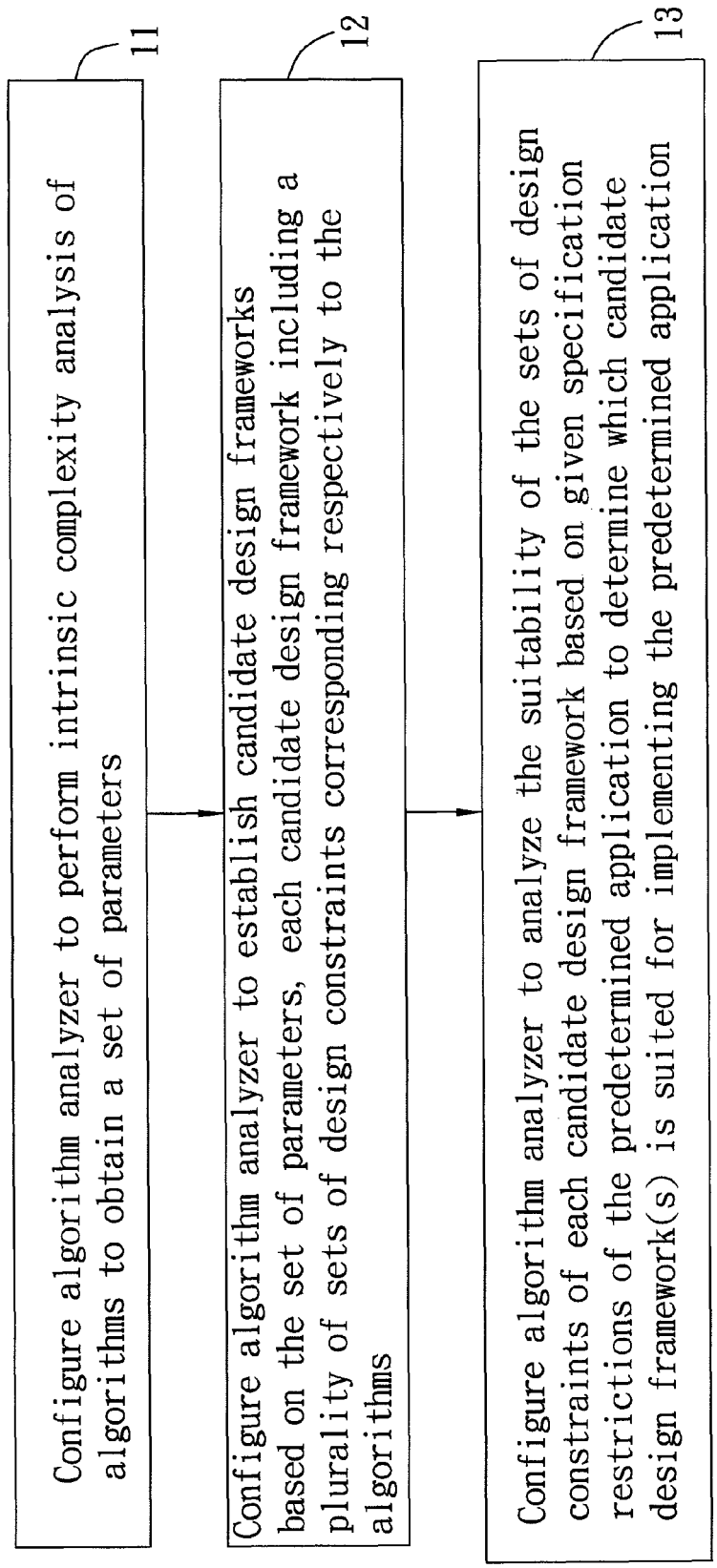
FIG. 1 is a flowchart of a method of determining a candidate design framework according to a preferred embodiment of the present invention.

The method of determining a design framework based on intrinsic complexities of a plurality of algorithms according to the preferred embodiment will now be described with reference to FIGS. 1 and 2.

First, in step 11, the intrinsic analysis module 110 of the algorithm analyzer 100 is configured to perform intrinsic complexity analysis with respect to the algorithms to obtain a set of parameters representing intrinsic characteristics of the algorithms. "Intrinsic complexity analysis" refers to analysis performed without considering software and hardware architectures, that is, the analysis is performed with respect to the algorithms per se. Therefore, the parameters will not vary for different software and hardware architectures and are independent of the same. This is in contrast with conventional methods which obtain analysis results that are directly tied to and not independent of particular hardware and software architectures, as described above.

Next, in step 12, the design framework establishing module 120 of the algorithm analyzer 100 is configured to establish a plurality of candidate design frameworks based on the set of parameters obtained in step 11. Each of the candidate design frameworks includes a plurality of sets of design constraints corresponding respectively to the algorithms. The sets of design constraints are used when designing a hardware and/or software configuration for implementing the predetermined application.

Finally, in step 13, the suitability analyzing module 130 of the algorithm analyzer 100 is configured to analyze the suitability of the sets of design constraints of each of the candidate design frameworks established in step 12 based on given specification restrictions of the predetermined application so as to determine which ones of the candidate design frameworks are suited for implementing the predetermined application.

The parameters representing intrinsic characteristics of the algorithms obtained in step 11 may include any combination of the following five parameters:

(a) Number and Type of Operators

This is the number of operators in each algorithm, as well as the operator types, such as addition, subtraction, multiplication, division, shifting, absolute value, modulus, comparison, and logic (e.g., AND). In some embodiments, information of the data format (e.g., integer operation or floating-point operation) and data width corresponding to each operator may also be included as part of the obtained parameters.

(b) Degree of Parallelism

This indicates the number of processors required to process an algorithm in a parallel manner. The number of processors represents the maximum degree of parallelism for an algorithm. For example, when the degree of parallelism is two, this means that some of the operators in the algorithm may be executed simultaneously with a maximum of two processors.

(c) Pipeline Depth

Pipeline depth of an algorithm indicates an interval cycle between when data is input and corresponding output data is generated. When a number of operators or data must be repeatedly used in an algorithm, an intrinsic pipeline depth is formed in the data path of the algorithm. For example, if a pipeline depth of an algorithm is two, this means that the input data of a first sampling cycle will not generate effective output data in the same sampling cycle, and the first effective output data is output only after the third sampling cycle. This is due to the fact that the first output data is obtained after the first input data is computed with second input data, which is input during the second sampling cycle, and subsequently output at the third sampling cycle. Therefore, in determining the complexity of an algorithm, the pipeline depth of the data path of the algorithm is a consideration of particular importance.

(d) Memory Configuration and Memory Size

In the data flow during execution of an algorithm, some temporary data has to be stored or updated, or data needs to be sent into the data path from memory at an exact point in time. Therefore, different memory configurations and memory sizes determine different data retrieval mechanisms.

(e) Input/Output Data Rate

This indicates an input data amount and an output data amount in a unit sampling time interval for an algorithm. With respect to multimedia signals, it is extremely important to be able to perform processing in real time. Therefore, the amount of data that needs to be input and output in each sampling cycle of an algorithm is an important factor used to determine whether real-time processing is feasible.

As to the specification restrictions of the predetermined application used in step 13 to analyze the suitability of the set of design constraints of each of the candidate design frameworks, these may include maximum clock speed, maximum area size, maximum memory bandwidth of the hardware architecture, etc. specified when a certain condition of the predetermined application is satisfied, such as conducting video signal processing in real time in a multimedia application. The specification restrictions are different for different products. For instance, when an MPEG (Moving Picture Experts Group) decoder is applied to HDTV (high-definition television), the decoder has special requirements with respect to resolution and picture quality processing. As a result, a substantial amount of computation is required, such that the maximum clock speed requirements are increased accordingly. In contrast, this multimedia application will not have requirements with respect to hardware area size restrictions. On the other hand, when the same application (MPEG decoder) is used in a mobile device, such as a mobile phone or an MP3 (Moving Picture Experts Group-1 Audio Layer 3) player, the image quality requirements are relatively low, i.e., there are no special requirements with respect to the clock speed. However, the requirements for other specifications, such as hardware area size and power consumption are higher. Hence, for the same multimedia application, use in different products requires different specifications, and the determination of these specifications may also take into consideration manufacturing cost (for example, the manufacturing process desired to be used which may directly impact the cost of production) or enhancing multimedia effect/efficiency (e.g., image quality).

A concrete example is provided in the following.

With respect to a deinterlacing technique in processing HDTV signals with a resolution of 1920×1080i and a frequency of 60 Hz, there are currently many algorithms that can be used for performing processing. However, the factors corresponding to each deinterlacing algorithm, such as software and hardware efficiency, software and hardware requirements, and software and hardware cost, are not the same. By utilizing the method of this invention, during the initial design stage, intrinsic complexity analysis may be performed with respect to each deinterlacing algorithm, so as to find the most suitable design framework (and the corresponding algorithm) that complies with the particular specification restrictions.

The most common deinterlacing algorithms may be classified as follows:

(1) Intra Interpolation

In this type of interpolation, the pixels that must be inserted are determined according to the other pixels in the same field. Intra interpolation includes line averaging, edge-based line averaging (ELA), and wide range edge-based line averaging (WRELA).

(2) Inter Interpolation

In this type of interpolation, the pixels that must be inserted are determined according to related pixels of a previous, same field (for example, if the current field is an even field, then the previous even field is used). Inter interpolation includes field insertion and field averaging.

(3) Vertical Temporal Filter (VTF)

In this type of interpolation, the pixels that must be inserted are determined according to related pixels of a previous field and the present field. VTF includes Linear 7 points, Linear 5 points, and Medium 3 points.

In step 11, as described above, the intrinsic analysis module 110 of the algorithm analyzer 100 is configured to perform intrinsic complexity analysis with respect to the algorithms to obtain a set of parameters representing intrinsic characteristics of the algorithms. The result of step 11 when intrinsic complexity analysis is performed with respect to the deinterlacing algorithms described above is outlined in Tables 1 and 2 below.

TABLE 1

| Algorithm | Number and type of operators | Degree of Parallelism | Pipeline depth |
|---|---|---|---|
| Line averaging | 1 addition (8-bit)<br>1 shift | Not restricted | 0 |
| ELA(3-tap) | 4 additions (8-bit)<br>2 comparisons (8-bit)<br>3 absolute value | Not restricted | 2 |
| ELA(5-tap) | 6 additions (8-bit)<br>4 comparisons (8-bit)<br>5 absolute value | Not restricted | 4 |
| WRELA | 6 additions (8-bit)<br>4 comparisons (8-bit)<br>5 absolute value | 1 | 0 |
| Field insertion | 0 | not restricted | 0 |
| Field averaging | 1 addition (8-bit)<br>1 shift | not restricted | 0 |
| Linear 7 points | 7 additions (8-bit)<br>1 multiplication (16-bit)<br>3 shift | not restricted | 0 |
| Linear 5 points | 5 additions (8-bit) | not restricted | 0 |
| Medium 3 points | 3 comparisons (8-bit) | not restricted | 0 |

TABLE 2

| Algorithm | Input/output data rate | | | | Memory configuration | | |
|---|---|---|---|---|---|---|---|
| | input | pixel buffer | Line buffer | field/line buffer | pixel buffer | line buffer | field buffer |
| Line averaging | 1 | 0 | 1 | 0 | 0 | 1 | 0 |
| ELA (3-tap) | 1 | 2 | 3 | 0 | 2 | 1 | 0 |
| ELA (5-tap) | 1 | 4 | 5 | 0 | 4 | 1 | 0 |
| WRELA | 1 | 5 | 5 | 0 | 2 0 | 1 | 0 |
| Field insertion | 0 | 0 | 0 | 1 | 0 | 0 | 1 |
| Field averaging | 1 | 0 | 0 | 1 | 0 | 0 | 2 |
| Linear 7 points | 1 | 0 | 3 | 3 | 0 | 3 | 1 |
| Linear 5 points | 1 | 0 | 1 | 3 | 0 | 1 | 1 |
| Medium 3 points | 1 | 0 | 1 | 1 | 0 | 1 | 1 |

It is to be noted that since the ELA algorithm is divided into several taps, first output data corresponding to first input data will be output after several sampling cycles. That is, the ELA algorithm has an intrinsic pipeline depth. For example, a 3-tap ELA algorithm has a pipeline depth of 4.

As for the field insertion algorithm, since the operation thereof involves inserting pixel values of the previous field into the present field so as to serve as pixels inserted into the present field, there are no additional calculations (i.e., no extra operators), and no input data (since all the pixel data in the field buffer may be directly output to the pixels to be inserted into the present field).

With respect to the WRELA algorithm, it is necessary to wait for the next pixel input before the direction of the boundary vector is calculated to determine whether it is suitable and to determine pixel values of the pixels waiting to be inserted. Therefore, at most 20 pixel buffers are needed for recording the maximum number of pixel values to be used for determination. At the same time, since it is necessary to wait for the next pixel input before calculating the pixel value of the next pixel to be inserted, the degree of parallelism thereof is 1 (i.e., pixel values must be calculated serially).

If it is assumed that the data format of input data of a high resolution television signal having a resolution of 1920×1080i and a frequency of 60 Hz is 4:2:0, the formula for calculating sampling frequency is as follows:

$$1920 \times 1080 \div 2 \times 60 \times 1.5 = 93.312M$$

That is, to realize real-time processing, the lowest sampling frequency should be 93.312 MHz.

Further, the specification restrictions of the multimedia application are as follows: an upper limit of the clock speed of 100 MHz, an upper limit of the logic gate count of 1000, an upper limit of the memory bus bandwidth of 200 MB/s, an upper limit of the size of the internal memory of 8 KB, and an upper limit of the size of the external memory of 2 MB.

Moreover, since the basic clock speed of NTSC/PAL is 27 MHz, if hardware architectures of four different clock speeds are used (including a first architecture having a clock speed of 216 MHz which is 8 times the basic clock speed, a second architecture having a clock speed of 108 MHz which is 4 times the basic clock speed, a third architecture having a clock speed of 54 MHz which is 2 times the basic clock speed, and a fourth architecture having a clock speed of 27 MHz which is at the basic clock speed), and based on the two parameters of the number and type of operators and the degree of parallelism obtained in step 11, candidate design frameworks are established in step 12 so as to obtain a plurality of sets of design constraints corresponding respectively to the algorithms. Tables 3 and 4 below outline the result of step 12 for this example of deinterlacing with respect to HDTV signals as described above. At this point, the architectures appearing in Tables 3 and 4 may be thought of as the candidate design frameworks established in step 12.

TABLE 3

| Deinterlacing algorithm | First architecture | | | Second architecture | | |
|---|---|---|---|---|---|---|
| | Clock speed (MHz) | Gate count | CLB # | Clock speed (MHz) | Gate count | CLB # |
| Line averaging | 216 | 48 | 1 | 108 | 96 | 2 |
| ELA (3-tap) | 216 | 288 | 6 | 108 | 576 | 12 |
| ELA (5-tap) | 216 | 480 | 10 | 108 | 960 | 20 |
| WRELA | 216 | 480 | 10 | 108 | 96 | 20 |
| Field insertion | 216 | 0 | 0 | 108 | 0 | 0 |
| Field averaging | 216 | 48 | 21 | 108 | 96 | 2 |
| Linear 7 points | 216 | 1200 | 25 | 108 | 2400 | 50 |
| Linear 5 points | 216 | 240 | 5 | 108 | 480 | 10 |
| Medium 3 points | 216 | 144 | 3 | 108 | 288 | 6 |

TABLE 4

| Deinterlacing algorithm | Third architecture | | | Fourth architecture | | |
|---|---|---|---|---|---|---|
| | Clock speed (MHz) | Gate count | CLB # | Clock speed (MHz) | Gate count | CLB # |
| Line averaging | 54 | 192 | 4 | 27 | 384 | 8 |
| ELA (3-tap) | 54 | 1152 | 24 | 27 | 2304 | 48 |
| ELA (5-tap) | 54 | 1920 | 40 | 27 | 3840 | 80 |
| WRELA | N/A | N/A | N/A | 27 | N/A | N/A |
| Field insertion | 54 | 0 | 0 | 27 | 0 | 0 |
| Field averaging | 54 | 192 | 1 | 27 | 384 | 2 |
| Linear 7 points | 54 | 4800 | 100 | 27 | 9600 | 200 |
| Linear 5 points | 54 | 960 | 20 | 27 | 1920 | 40 |
| Medium 3 points | 54 | 576 | 12 | 27 | 1152 | 24 |

In some embodiments, the design framework establishing module 120 of the algorithm analyzer 100 is configured to obtain the design constraint of each of a gate count and a configurable logic block (CLB) number for each of the candidate design frameworks and corresponding to each of the algorithms based on the number and type of operators in the algorithm. Furthermore, in some embodiments, the design framework establishing module 120 of the algorithm analyzer 100 is configured to obtain the design constraint of a clock speed for each of the candidate design frameworks and corresponding to each of the algorithms based on the degree of parallelism of the algorithm.

The gate count is a parameter used when each of the candidate design frameworks is realized using an integrated circuit (IC) manufactured using semiconductor techniques, in which case the estimated chip area size when forming the circuit is a multiple of the area size of the unit basic logic gate. The CLB number is a parameter used when each of the candidate design frameworks is realized through a Xilinx® Virtex-II Pro FPGA (field programmable gate array), in which case the FPGA is configured around a matrix of CLBs. Since obtaining the gate count and CLB number from the number and type of operators is well known in the art, a detailed description in this regard is not provided herein.

With respect to the first and second architectures, the clock speeds thereof are higher than the lowest sampling frequency (93.312 MHz), and hence all the deinterlacing algorithms can be used in conjunction with the first and second architectures. However, with respect to the third and fourth architectures, since the clock speeds thereof are lower than the lowest sampling frequency, parallel processing must be selected in a manner ensuring that the requirements of real-time processing are satisfied. It is evident from Table 4 that the gate count or CLB number of the third architecture may become nearly double that of the second architecture, which indicates that the third architecture uses at least two identical processors to perform parallel processing. Therefore, although the clock speed of the third architecture is lower than the lowest sampling frequency, the purpose of real-time processing can still be achieved by parallel processing. It is to be noted that, in Table 4, since the degree of parallelism of the WRELA algorithm is 1, the WRELA algorithm cannot be used in conjunction with the third and fourth architectures.

Therefore, for this particular deinterlacing example, which involves specification restrictions of an upper limit of the clock speed of 100 MHz and an upper limit of the gate count of 1000 as described above, the candidate design frameworks, which are established in step 12 based on the two parameters of the number and type of operators and the degree of parallelism, that are suited for implementing this multimedia application as determined in step 13 are as outlined in Table 5 below. In Table 5, ◎ indicates the candidate design frameworks that are suited for the multimedia application.

TABLE 5

| Deinterlacing Algorithm | First architecture | Second architecture | Third architecture | Fourth architecture |
|---|---|---|---|---|
| Line averaging | | | ◎ | ◎ |
| ELA(3-tap) | | | | |
| ELA(5-tap) | | | | |
| WRELA | | | | |
| Field insertion | | | ◎ | ◎ |
| Field averaging | | | ◎ | ◎ |
| Linear 7 points | | | | |
| Linear 5 points | | | ◎ | |
| Medium 3 points | | | ◎ | |

The first and second architectures cannot be used since their clock speeds exceed the upper limit of the clock speed of 100 Mhz. With respect to the third architecture, the five algorithms of line averaging, field insertion, field averaging, linear 5 points, and medium 3 points may be used in conjunction with the third architecture as the design constraints of the third architecture corresponding to these algorithms satisfy the specification restrictions. Moreover, with respect to the fourth architecture, the three algorithms of line averaging, field insertion, and field averaging may be used in conjunction with the fourth architecture as the design constraints of the fourth architecture corresponding to these algorithms satisfy the specification restrictions.

It is to be noted that in Tables 3 to 5, results shown therein are those that were obtained when only the two parameters of the number and type of operators and the degree of parallelism are used to perform analysis. In some embodiments, steps 12 and 13 may be repeated based on the other three parameters of pipeline depth, memory configuration and memory size, and input/output data rate to thereby obtain additional analysis results. The best solution may be obtained by combining the two analysis results. Hence, results of repeating steps 12 and 13 based on the other three parameters of pipeline depth, memory configuration and memory size, and input/output data rate will now be described.

While the cost of internal memory is higher than that of external memory, since data access does not need to be conducted via an external memory bus with respect to internal memory, the data retrieval efficiency is higher for internal memory than it is for external memory. Taking four different memory hierarchies as an example (including a first memory hierarchy having no internal line buffer, a second memory hierarchy having an internal line buffer, a third memory hierarchy having two internal line buffers, and a fourth memory hierarchy having a maximum number of internal line buffers), and based on the three parameters of pipeline depth, memory configuration and memory size, and input/output data rate obtained in step 11, candidate design frameworks of different memory hierarchies are established in step so as to obtain a plurality of sets of design constraints corresponding respectively to the algorithms. Tables 6 and 7 below outline the result of step 12 for this example. "BW" in Tables 6 and 7 indicates "bandwidth." The memory hierarchies of Tables 6 and 7 may be thought of as the candidate design frameworks established in step 12.

TABLE 6

| Deinterlacing algorithm | Register Number | First memory hierarchy | | | | Second memory hierarchy | | | |
|---|---|---|---|---|---|---|---|---|---|
| | | internal memory | | bus | external memory | internal memory | | bus | external memory |
| | | BW | size (bytes) | BW | size (bytes) | BW | size (bytes) | BW | Size (bytes) |
| Line averaging | 0 | 0 | 0 | 186.6 | 2880 | 93.3 | 2880 | 93.3 | 0 |
| ELA (3-tap) | 2 | 0 | 0 | 373.2 | 2880 | 279.9 | 2880 | 93.3 | 0 |
| ELA (5-tap) | 4 | 0 | 0 | 559.9 | 2880 | 466.5 | 2880 | 93.3 | 0 |
| WRELA | 20 | 0 | 0 | 559.9 | 2880 | 466.5 | 2880 | 93.3 | 0 |
| Field insertion | 0 | 0 | 0 | 93.3 | 1555200 | N/A | N/A | N/A | N/A |
| Field averaging | 0 | 0 | 0 | 186.6 | 3110400 | N/A | N/A | N/A | N/A |
| Linear 7 points | 0 | 0 | 0 | 653.2 | 1563600 | 93.3 | 2880 | 559.8 | 1558080 |
| Linear 5 points | 0 | 0 | 0 | 466.6 | 1558000 | 93.3 | 2880 | 373.2 | 1560960 |
| Medium 3 points | 0 | 0 | 0 | 279.9 | 1558000 | 93.3 | 2880 | 186.6 | 1555200 |

TABLE 7

| Deinterlacing algorithm | Register Number | Third memory hierarchy | | | | Fourth memory hierarchy | | | |
|---|---|---|---|---|---|---|---|---|---|
| | | internal memory | | bus | external memory | internal memory | | bus | external memory |
| | | BW | size (bytes) | BW | size (bytes) | BW | size (bytes) | BW | size (bytes) |
| Line averaging | 0 | N/A | N/A | N/A | N/A | 93.3 | 2880 | 93.3 | 0 |
| ELA (3-tap) | 2 | N/A | N/A | N/A | N/A | 279.9 | 2880 | 93.3 | 0 |
| ELA (5-tap) | 4 | N/A | N/A | N/A | N/A | 466.5 | 2880 | 93.3 | 0 |
| WRELA | 20 | N/A | N/A | N/A | N/A | 466.5 | 2880 | 93.3 | 0 |
| Field insertion | 0 | N/A | N/A | N/A | N/A | 0 | 0 | 93.3 | 1555200 |
| Field averaging | 0 | N/A | N/A | N/A | N/A | 0 | 0 | 186.6 | 311040 |
| Linear 7 points | 0 | 186.6 | 5760 | 466.5 | 1558080 | 466.5 | 14000 | 186.6 | 1555200 |
| Linear 5 points | 0 | 186.6 | 5760 | 279.9 | 1555200 | 279.9 | 8640 | 186.6 | 1555200 |
| Medium 3 points | 0 | N/A | N/A | N/A | N/A | 93.3 | 2880 | 186.6 | 1555200 |

As is evident from Tables 6 and 7, in some embodiments, the design framework establishing module 120 of the algorithm analyzer 100 is configured to obtain the design constraints of a size and bandwidth of an internal memory, a size of an external memory, and a bandwidth of a memory bus for each of the candidate design frameworks and corresponding to each of the algorithms. In some embodiments, the design framework establishing module 120 of the algorithm analyzer 100 is configured to obtain the design constraint of a number of registers for each of the candidate design frameworks and corresponding to each of the algorithms based on the pipeline depth of the algorithm.

Since the parameter of the pipeline depth of the ELA algorithm is restricted, several registers must be used for storing temporary data generated on the data path. Further, with respect to the WRELA algorithm, it is necessary to wait for the next pixel input before the direction of the boundary vector is calculated to determine whether it is suitable and to determine pixel values of the pixels waiting to be inserted. Therefore, at most 20 pixel buffers are needed for recording the maximum number of pixel values to be used for determination.

With respect to the first memory hierarchy, since the internal memory required thereby is the smallest, all data must be stored in the external memory, and at the same time, the bandwidth of the memory bus must be enlarged so as to maintain a sufficient data retrieval rate. However, internal line buffers are added to the second, third, and fourth memory hierarchies, such that all the required data can be stored in internal memory so as to minimize access to the external memory. Hence, the bandwidth of the memory bus can be smaller than that of the first memory hierarchy.

It is to be noted that, due to the intrinsic algorithm characteristics, the two algorithms of field insertion and field averaging do not require an internal line buffer, and only the two algorithms of linear 7 points and linear 5 points require the use of two or more internal line buffers so as to reduce the bandwidth demand of the memory bus. Linear 7 points uses at most five internal line buffers, and linear 5 points uses at most 3 internal line buffers. The analysis results related in this aspect are listed in the column of the fourth memory hierarchy in Table 7.

Therefore, for this particular deinterlacing example, which involves specification restrictions of an upper limit of the memory bus bandwidth of 200 MB/s, an upper limit of the internal memory size of 8 KB, and an upper limit of the external memory size of 2 MB as described above, the candidate design frameworks, which are established in step 12 based on the three parameters of pipeline depth, memory configuration and memory size, and input/output data rate, that are suited for implementing this multimedia application as determined in step 13 are as outlined in Table 8 below. In Table 8, ⊚ indicates the candidate design frameworks that are suited for the multimedia application.

TABLE 8

| Deinterlacing algorithm | First memory hierarchy | Second memory hierarchy | Third memory hierarchy | Fourth memory hierarchy |
|---|---|---|---|---|
| Line averaging | ⊚ | ⊚ | | ⊚ |
| ELA(3-tap) | | ⊚ | | ⊚ |
| ELA(5-tap) | | ⊚ | | ⊚ |
| WRELA | | ⊚ | | ⊚ |
| Field insertion | ⊚ | | | ⊚ |
| Field averaging | | | | |
| Linear 7 points | | | ⊚ | |
| Linear 5 points | | | ⊚ | |
| Medium 3 points | | | ⊚ | ⊚ |

With respect to the third memory hierarchy, the memory bus bandwidth of linear 7 points and linear 5 points exceeds the upper limit of 200 MB/s, and therefore cannot be used. Moreover, since the possible maximum internal line buffers for each of the five algorithms of line averaging, ELA(3-tap), ELA(5-tap), WRELA, and medium 3 points is 1, the fourth memory hierarchy with respect to the algorithms is equal to the second memory hierarchy. Similarly, since field insertion does not require an internal line buffer, the fourth memory hierarchy thereof equals the first memory hierarchy. Hence, the design constraints of the fourth memory hierarchy do not comply with the specification restrictions and are different from those of the first and second memory hierarchies. As a result, if the first memory hierarchy is adopted, then the two algorithms of line averaging and field insertion can be used in conjunction therewith. If the second memory hierarchy is adopted, then all algorithms except field insertion and field averaging can be used therewith.

Therefore, if the results of Tables 5 and 8 are combined, for this particular deinterlacing multimedia application having the specification restrictions as outline above (i.e., an upper limit of the clock speed of 100 MHz, an upper limit of the gate count of 1000, an upper limit of the memory bus bandwidth of 200 MB/s, an upper limit of the internal memory size of 8 KB, and an upper limit of the external memory size of 2 MB), the usable architectures and memory hierarchies, and the corresponding algorithms are as follows:

A. Line Averaging
[1] the third architecture incorporated with the first memory hierarchy
[2] the fourth architecture incorporated with the first memory hierarchy
[3] the third architecture incorporated with the second memory hierarchy
[4] the fourth architecture incorporated with the second memory hierarchy
B. Field Insertion
[1] the third architecture incorporated with the first memory hierarchy
[2] the fourth architecture incorporated with the first memory hierarchy
C. Linear 5 Points
[1] the third architecture incorporated with the second memory hierarchy
D. Medium 3 Points
[1] the third architecture incorporated with the second memory hierarchy In the above, the combinations of particular architectures with particular memory hierarchies are the optimal design frameworks.

Therefore, when complying with the specification restrictions of the multimedia application described above, there are eight design frameworks that are suited for implementing the multimedia application. Furthermore, an appropriate design framework may be chosen from among these eight design frameworks depending on a certain requirement(s) desired by the designer. For example, if quality of deinterlacing is the top priority, the design framework associated with linear 5 points may be selected (i.e., the third architecture incorporated with the second memory hierarchy), since the processing effect of linear 5 points is the best. On the other hand, if cost is the top priority, then another design framework may be chosen.

Hence, according to the method and the algorithm analyzer 100 of the present invention described above, a top-down approach is used to determine a design framework(s), in which the intrinsic characteristics of an algorithm(s) are used as the starting point in determining the optimal design framework for a predetermined application. This is in contrast to the bottom-up approach used by conventional methods, in which a specific software and hardware platform is first designated, and an optimal algorithm is found for this particular platform. Therefore, while a local optimal solution is found using conventional methods, a global optimal solution for the predetermined application is found using the present invention. Furthermore, by adding to the specification restrictions, a suitable design framework may be found even more quickly using the present invention, thereby minimizing the overall cost of design.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A method of determining a design framework, said method being implemented by a computer machine operating as an algorithm analyzer, the method comprising:
a) performing, by the algorithm analyzer, intrinsic complexity analysis with respect to an algorithm for a predetermined application to obtain a set of parameters representing intrinsic characteristics of the algorithm;

b) establishing, by the algorithm analyzer, a plurality of candidate design frameworks based on the set of parameters obtained in step a), each of the candidate design frameworks including a set of design constraints corresponding to the algorithm, the set of design constraints being used when designing a hardware and/or software configuration for implementing the predetermined application; and c) analyzing, by the algorithm analyzer, the suitability of the set of design constraints of each of the candidate design frameworks established in step b) based on given specification restrictions of the predetermined application so as to determine which ones of the candidate design frameworks are suited for implementing the predetermined application.

2. The method of claim 1, wherein the parameters include a number and type of operators in the algorithm.

3. The method of claim 2, wherein, in step b), the algorithm analyzer is configured to obtain the design constraint of each of a gate count and a configurable logic block number for each of the candidate design frameworks based on the number and type of operators in the algorithm.

4. The method of claim 1, wherein the parameters include a degree of parallelism of the algorithm, which indicates a number of processors required to process the algorithm in a parallel manner.

5. The method of claim 4, wherein, in step b), the algorithm analyzer is configured to obtain the design constraint of a clock speed for each of the candidate design frameworks based on the degree of parallelism of the algorithm.

6. The method of claim 1, wherein the parameters include a memory configuration and a memory size needed for analysis of the algorithm.

7. The method of claim 6, wherein the parameters further include an input/output data rate which indicates an input data amount and an output data amount in a unit sampling time interval for the algorithm and, in step b), the algorithm analyzer is configured to obtain the candidate design frameworks of different memory hierarchies based on the memory configuration, the memory size, and the input/output data rate for the algorithm.

8. The method of claim 7, wherein, in step b), the set of design constraints of each of the candidate design frameworks of different memory hierarchies includes a size and bandwidth of an internal memory, a size of an external memory, and a bandwidth of a memory bus.

9. The method of claim 1, wherein the parameters include an input/output data rate which indicates an input data amount and an output data amount in a unit sampling time interval for the algorithm.

10. The method of claim 1, wherein the parameters include a pipeline depth, which indicates an interval cycle between when data is input and corresponding output data is generated, of the algorithm.

11. The method of claim 10, wherein, in step b), the algorithm analyzer is configured to obtain the design constraint of a number of registers for each of the candidate design frameworks based on the pipeline depth of the algorithm.

12. A computer program product comprising a non-transitory computer-readable storage medium that stores program instructions for configuring a computer to operate as an algorithm analyzer that executes consecutive steps of a method of determining a design framework according to claim 1.

13. The method of claim 1, wherein the specification restrictions include at least one of a clock speed, a logic gate count, a memory bus bandwidth, an internal memory size, and an external memory size.

14. An algorithm analyzer for determining a design framework, comprising:

an intrinsic analysis module for performing intrinsic complexity analysis with respect to an algorithm for a predetermined application to obtain a set of parameters representing intrinsic characteristics of the algorithm;

a design framework establishing module coupled to said intrinsic analysis module, said design framework establishing module establishing a plurality of candidate design frameworks based on the set of parameters obtained by said intrinsic analysis module, each of the candidate design frameworks including a set of design constraints corresponding to the algorithm, the set of design constraints being used when designing a hardware and/or software configuration for implementing the predetermined application; and a suitability analyzing module coupled to said design framework establishing module, said suitability analyzing module analyzing the suitability of the set of design constraints of each of the candidate design frameworks established by said design framework establishing module based on given specification restrictions of the predetermined application so as to determine which ones of the candidate design frameworks are suited for implementing the predetermined application.

* * * * *